(12) United States Patent
Gartner

(10) Patent No.: US 7,628,110 B2
(45) Date of Patent: Dec. 8, 2009

(54) SYSTEM AND METHOD FOR MOUNTING A PLATE TO AN ADHESIVE MEMBER

(76) Inventor: Gerald J. Gartner, P.O. Box 1528, 134 Dow Rd., Hollis, NH (US) 03049

( * ) Notice: Subject to any disclaimer, the term of this patent is extended or adjusted under 35 U.S.C. 154(b) by 286 days.

(21) Appl. No.: 11/550,252

(22) Filed: Oct. 17, 2006

(65) Prior Publication Data

US 2007/0125254 A1 Jun. 7, 2007

Related U.S. Application Data

(60) Provisional application No. 60/727,294, filed on Oct. 17, 2005.

(51) Int. Cl.
| | |
|---|---|
| *B41F 1/34* | (2006.01) |
| *B41F 21/12* | (2006.01) |
| *B41F 21/14* | (2006.01) |
| *B41F 27/12* | (2006.01) |
| *B41F 13/10* | (2006.01) |
| *B41F 27/06* | (2006.01) |
| *B41F 27/00* | (2006.01) |
| *B41L 1/02* | (2006.01) |
| *B41L 47/14* | (2006.01) |

(52) U.S. Cl. .................. 101/485; 101/477; 101/378; 101/382.1; 101/DIG. 36

(58) Field of Classification Search ............ 101/377, 101/382.1, 477, 486, 485, DIG. 36, 378
See application file for complete search history.

(56) References Cited

U.S. PATENT DOCUMENTS 3,368,439 A * 2/1968 Bungay, Jr. ............ 83/437.1

4,015,034 A * 3/1977 Smolen ............ 428/41.2

(Continued)

OTHER PUBLICATIONS

JM Heaford Limited Narrow Web Video Plate Mounting Product Sheet.

(Continued)

*Primary Examiner*—Judy Nguyen
*Assistant Examiner*—Leo T Hinze
(74) *Attorney, Agent, or Firm*—Bourque and Associates, PA

(57) ABSTRACT

A system and method for adhering and aligning a generally flat, planar object to an adhesive layer, and for facilitating the mounting of the generally flat planar object, such as a printing plate, in near perfect alignment in a cylindrical manner. The method includes providing a generally flat, planar object such as a printing plate and an adhesive member having an adhesive layer at least on one surface. The adhesive member is preferably approximately the same size as the printing plate. The printing plate is mounted to the adhesive member such that there is one edge of the adhesive member which is not initially covered by the printing plate and one edge of the printing plate which overhangs the adhesive member. The combined adhesive member/printing plate structure is next rolled into a cylindrical form and held in place on a device which allows alignment marks on the printing plate to align the two ends of the printing plate prior to the printing plate being fully adhered to the adhesive member. The resulting sleeve structure can then be inserted onto a plate cylinder and this assembly utilized in a printing press. In another embodiment, the adhesive member is provided as a single or multi-layered structure pre-rolled into a generally circular form.

33 Claims, 5 Drawing Sheets

U.S. PATENT DOCUMENTS

| | | | | |
|---|---|---|---|---|
| 4,033,259 A | * | 7/1977 | Schuhmann | 101/174 |
| 5,052,120 A | * | 10/1991 | Lubberts | 33/618 |
| 5,355,797 A | * | 10/1994 | Tielrooy | 101/177 |
| 5,492,059 A | * | 2/1996 | Reichel | 101/375 |
| 5,626,076 A | * | 5/1997 | Ireton | 101/401.1 |
| 5,676,058 A | * | 10/1997 | Ireton | 101/486 |
| 5,850,789 A | * | 12/1998 | Rudolf et al. | 101/486 |
| 6,450,092 B2 | * | 9/2002 | Kamir et al. | 101/170 |

OTHER PUBLICATIONS

Mark Andy "PM" and "VPM" Plate Mounters Product Sheet.

* cited by examiner

SYSTEM AND METHOD FOR MOUNTING A PLATE TO AN ADHESIVE MEMBER

CROSS-REFERENCE TO RELATED APPLICATIONS

This application is related to U.S Patent Application No. 60/727,294 filed Oct. 17, 2005 entitled "System And Method For Mounting A Printing Plate Using Sleeves", which is incorporated fully herein by reference.

TECHNICAL FIELD

The present invention relates in one embodiment to the printing industry and more specifically, relates to a method for mounting a printing plate in a circular manner in near perfect alignment more easily and inexpensively, thereby providing near perfect alignment of the resultant printed image.

BACKGROUND INFORMATION

The printing industry now nearly exclusively utilizes photographic or digitally imaged printing plates to produce a printed image. Although this invention is primarily aimed at Flexographic printing, it could be used for letterpress and offset printing, rotary screen printing as well as in any operation were it is desirable to wrap a flat planar item around a concave or convex (oval, a round, etc.) cylinder. In some instances, these "printing plates" are utilized only one time since the printed image will generally change with the printing job while in other instances, the printing plates will be re-used and are therefore saved.

Most printing presses utilize a circular drum (commonly called the "plate cylinder") on which the printing plate is mounted. By rotating the plate cylinder and printing plate first in contact with ink and next in contact with the substrate to be printed (paper, plastic, foil, etc.), the image is transferred from the plate to the paper. In the offset lithography process, a transfer drum called the "blanket" is between the printing plate and the printed substrate.

When printing a one color product, proper alignment of the printing plate on the drum is important to maintain proper orientation to the substrate. When printing in multiple colors, the printing press must have one rotating drum and printing plate assembly for each color to be printed. In such cases, proper alignment ("registration") of the printing plates on the drums is essential otherwise, the finished product will have improperly aligned images and colors in addition to improper alignment to the substrate.

In flexographic printing, the plate is usually attached to an expensive plate cylinder using double sided tape called "stickyback". Stickyback has either a solid (usually rubber or polymer) core or foam core with adhesive applied to both sides. If a plate is to be used in a subsequent run of the same or similar product, it may be desirable to keep it mounted on the cylinder.

Since this would tie up that expensive cylinder making it not available for other jobs, an alternative has been employed where the plate is mounted on an intermediate shell or sleeve which slides on and off the plate cylinder. These sleeves are usually metal or some plastic or composite material. While less costly than plate cylinders, sleeves are still quite expensive. Many printers have cited the benefits of sleeve mounting, but do not use it because of the high sleeve cost per unit and because a large inventory of blank sleeves matched in diameter to the various sizes of plate cylinders in stock must be maintained to accommodate new jobs as they are scheduled.

The alignment accuracy of the plates is critical to high quality printing and minimizing waste due to mis-alignment or "mis-register". Substrate and ink waste are usually large expenses to printing companies and they constantly try to minimize this waste. Lower waste also means shorter production time and thus reduced labor and overhead costs. A number of plate mounting systems are commercially available to mount plates directly on the cylinders or onto the sleeves. These systems generally utilize a method of alignment of two points on the surface of the plate, making the assumption that if all multiple images are in registration relative to two points, the entire composite multi color (or multi plate)image will be in registration. The systems generally use CCD cameras or microscopes to achieve this alignment. Some systems employ attachment points (holes or protrusions) which can be mechanically aligned. The same systems are used to mount plates on to plate cylinders or sleeves, so the current use of sleeves does nothing to improve the registration accuracy.

These systems have served the industry well, but they have some limitations. First, not all cylinders are exactly of the same diameter. Diametric differences can be introduced by the stickyback. Therefore, even if the leading or trailing edges or central region of the plates are aligned, there is no guarantee that the following and trailing portion are registered (aligned). Also, there is no way to assure that the individual who mounts the plates uses the same pressure, which can introduce variability.

Accordingly, what is needed is a new system and method for forming a printing plate mounted on a sleeve which is both highly accurate and inexpensive.

SUMMARY

The present invention features a novel system and method for forming and adhering a photographic or digitally generated printing plate or other generally flat, planar object into a circular member that can then be inserted onto the drum of a printing press or other device. The invention assumes that the printing plate will have imaged thereon a minimum of one and preferably two or more alignment marks. These alignment marks ensure that the printing plate can be mounted in a circular manner with proper alignment between the marks to prevent image misalignment and image skew.

The present method provides, in addition to a printing plate, an adhesive member. The adhesive member, typically made of any combination of metal, polymer foam, solid polymer, rubber, etc, includes an adhesive layer on at least one side. In some embodiments, there maybe an adhesive layer on the second side as well. The adhesive member has approximately the same lateral dimensions as the printing plate, but may be thicker or thinner. In one embodiment, the piece of member may be provided as a flat, generally planar member having adhesive on at least one surface. In another preferred embodiment, the adhesive member may be provided at least somewhat "pre-formed" or bent into a generally circular form. The adhesive member may be a single or multilayered structure.

In one embodiment, the present invention begins by exposing at least a portion of the adhesive on one surface of the adhesive member and proximate a first edge of the adhesive sheet. The area immediate to the first edge is covered with a release layer that prevents sticking to the adhesive. Next, the photographic plate or other flat generally planar object is attached to the adhesive sheet proximate but not at the edge of the adhesive member. This attachment leaves a region of the adhesive sheet back from the edge to which nothing yet is attached. This dimension of edge can range from approximately ¼" inch to 2" inches in width, although this is not a limitation of the present invention.

The printing plate is secured to the remainder of the adhesive sheet. This now leaves a section of printing plate which has not yet been attached to the adhesive sheet because of the offset in the initial attachment point.

The partially adhered printing plate and adhesive sheet are next rolled into a circular form and held in place in a printing plate mounting device. Using either a manual or automatic alignment process using equipment such as a microscope, camera, clamp, automated vision system or the like, the registration marks located on each end of the printing plate are properly aligned, the release sheet removed from proximate the first end, and finally the second end of the printing plate is adhered to the first end of the adhesive sheet thus forming a circular "sleeve" which can subsequently be mounted on a printing press drum. Using this method, each and every printing plate will be arranged in a circular format ready to be mounted on a printing press drum in perfect alignment thereby essentially eliminating misalignment or skew caused by improperly aligned printing plates.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 2:
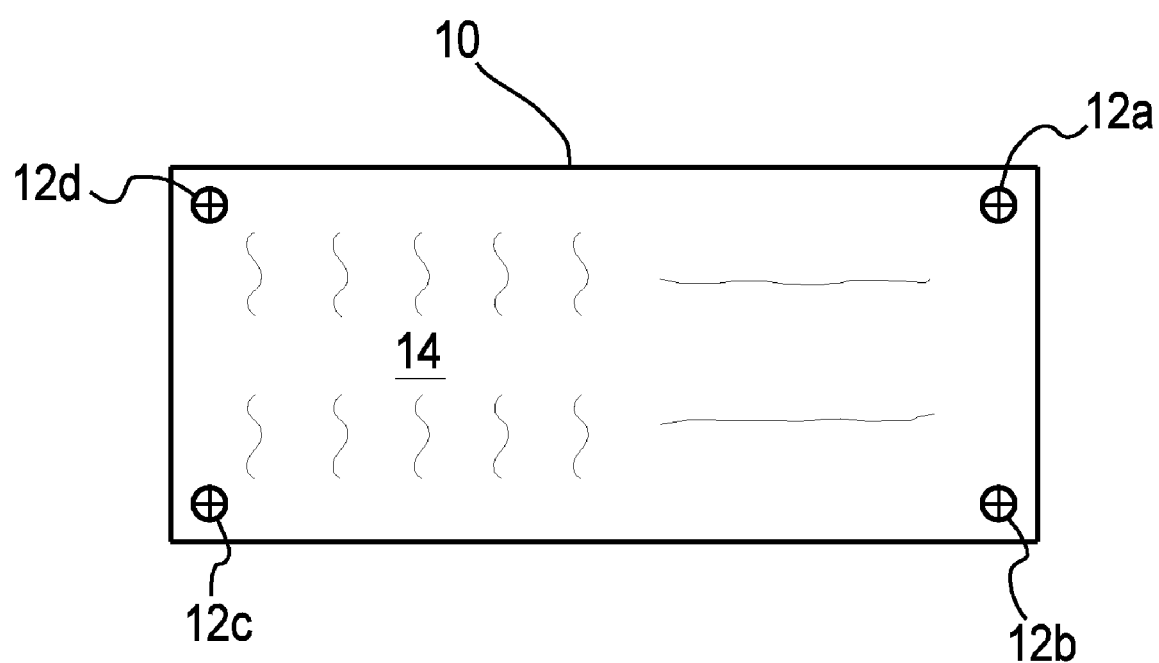
FIG. 2 is a top plan view of a printing plate having imaged thereon indicia and several alignment marks.

The present invention features a novel system and method for forming a photographically or digitally generated printing plate or other generally flat, planar object into a circular sleeve that can then be inserted onto the drum of a printing press or other device. The invention assumes that the printing plate 10, FIG. 2, will have imaged or otherwise placed thereon one or more and preferably four (4) alignment marks 12 in addition to the indicia 14 (text and/or images) to be printed. Although the present invention will be explained in connection with the flexography method of printing, this is not a limitation of the present invention.

Flexography is a "relief" printing process meaning that the image portion of the plate is raised above the "floor" of the plate (such as a rubber stamp). The "letterpress" method is also a relief printing process whereas offset lithography plates are essentially planar and rely on the chemistry of the printing area. The present invention applies equally well to all the above referenced printing technologies and to other areas of technology unrelated to printing.

The alignment or registration marks may be two-dimensional marks imaged on the surface of the printing plate or other generally flat, planar object to be aligned. The two-dimensional marks may include a specific design, such as a dot, cross hair mark or the like, to aid alignment. The alignment or registration marks 12 may also include three-dimensional marks protruding from the generally flat planar surface of the object to be aligned. The tops of these protrusions may also include an alignment aid such as a dot, crosshair mark or the like. The alignment marks 12 ensure that the printing plate can be mounted in a circular manner with proper alignment between the marks to prevent image misalignment and image skew. Although two marks are contemplated as a minimum, there are preferably provided four alignment marks. In addition, only one alignment mark or region having one or more alignment features may be provided, all without departing from the scope of the present invention.

Figure 1:
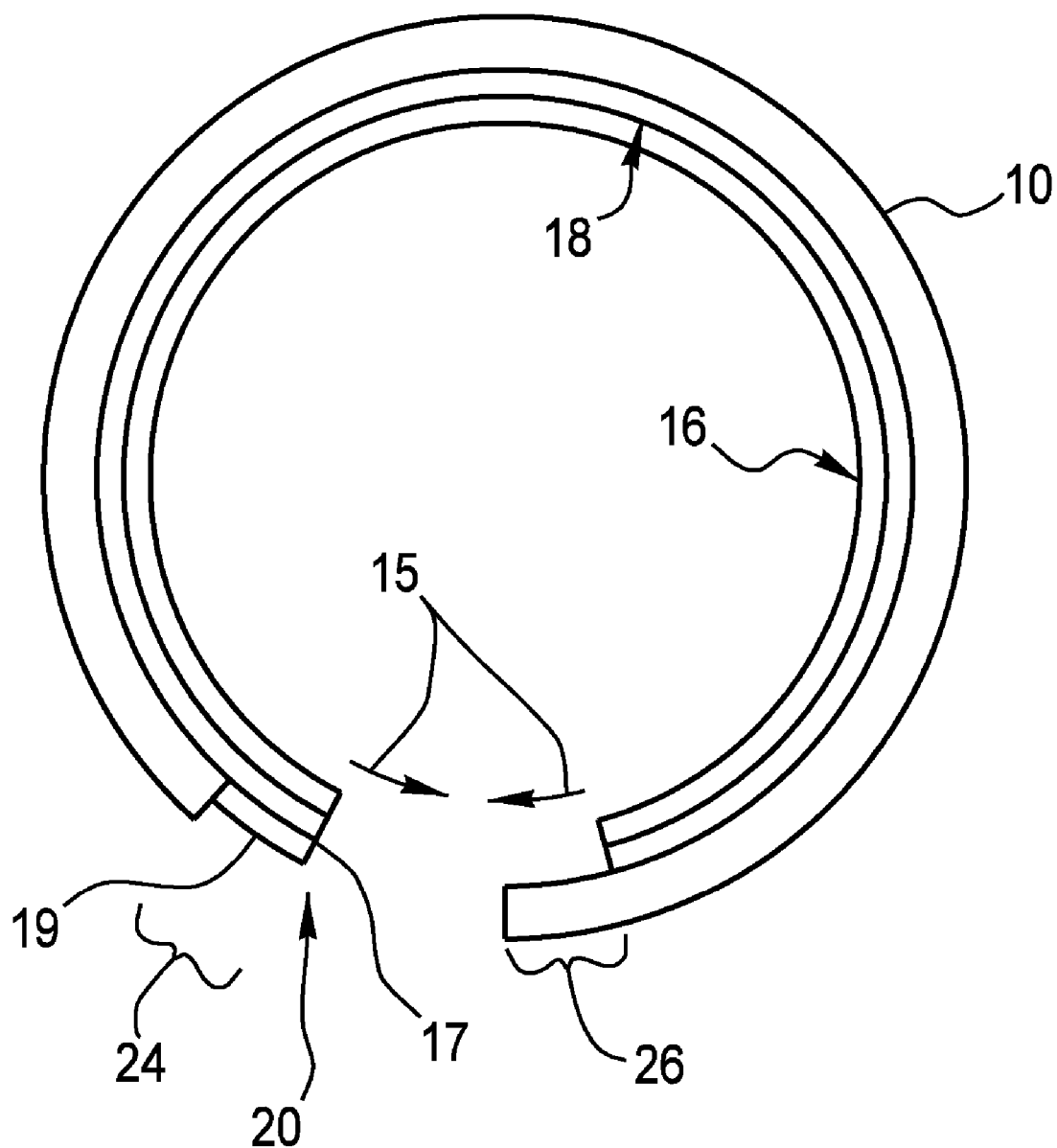
FIG. 1 is side view of the thin film adhesive and printing plate partially assembled in accordance with the teachings of the present invention.

The present method provides, in addition to a printing plate 10, an adhesive member 16, FIG. 1. The adhesive member 16, typically made of any combination of metal, polymer foam, solid polymer, rubber, etc, includes an adhesive layer 17 on at least one surface, such as surface 18. In some embodiments, there maybe an adhesive layer on the second surface as well. The adhesive member 16 has approximately the same lateral dimensions (length and width) as the printing plate 10 but may be of a different thickness.

The present invention begins by exposing at least a portion of the adhesive 17 on one surface 18 of the adhesive member 16. Typically, the one surface 18 will be covered by a thin silicone paper or similar release sheet 19. Alternatively, the one surface 18 of the adhesive member may covered by a release sheet in two sections; one larger sheet covering most of the surface 18 and the other, a smaller release sheet 19 disposed only in the region 24 of the adhesive member 16 that will not have the plate 10 attached to it at this time (much like the pull tabs used in printed toner cartridges.)

Next, the plate 10 is attached to the adhesive sheet 16 proximate but not directly at one edge 20 of the adhesive member 16. This attachment method leaves a region 24 of the adhesive sheet 16 back from the edge 20 to which nothing yet is attached. The dimension of the region 24 is preferably 1 inch although this dimension can range from approximately ¼ inch to 2 inches in width, however this is not a limitation of the present invention. This pre-assembly process will preferably be done on a cylinder because the final sleeve is cylindrical and the laminated construction described will resist significant bending although this is not a limitation on the invention.

Figure 3:
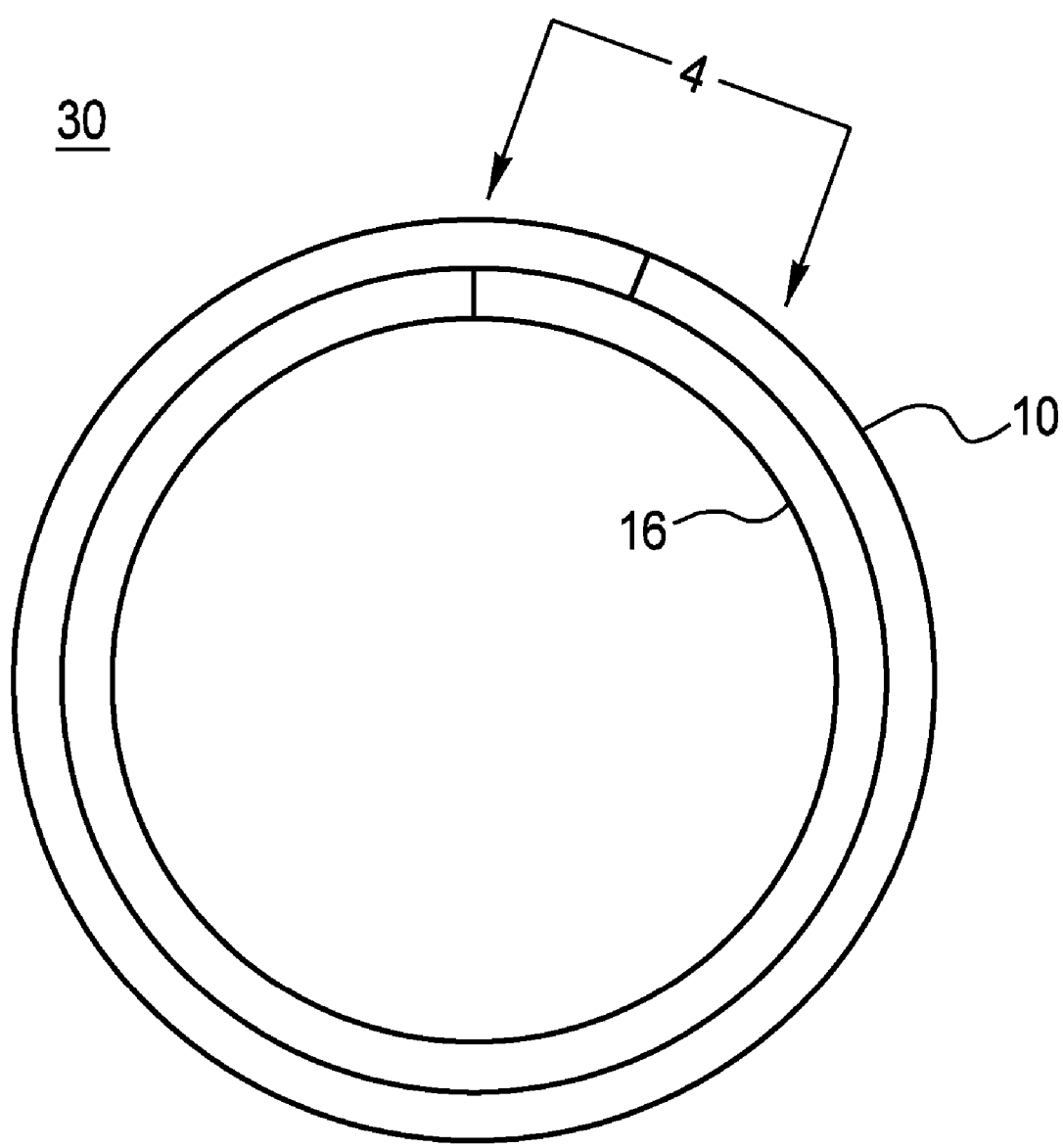
FIG. 3 is an end view of the thin film and attached printing plate assembled into a sleeve according to the present invention.
Figure 4:
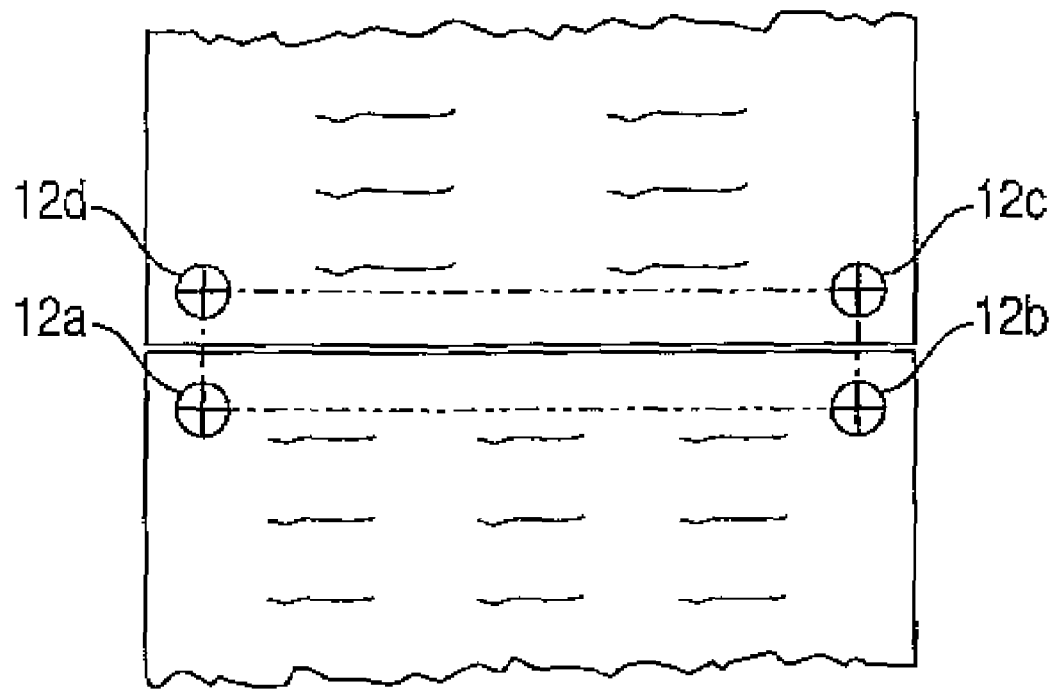
FIG. 4 is a top view of the two ends of the printing plate of FIG. 3 aligned on a circular adhesive member.
Figure 5:
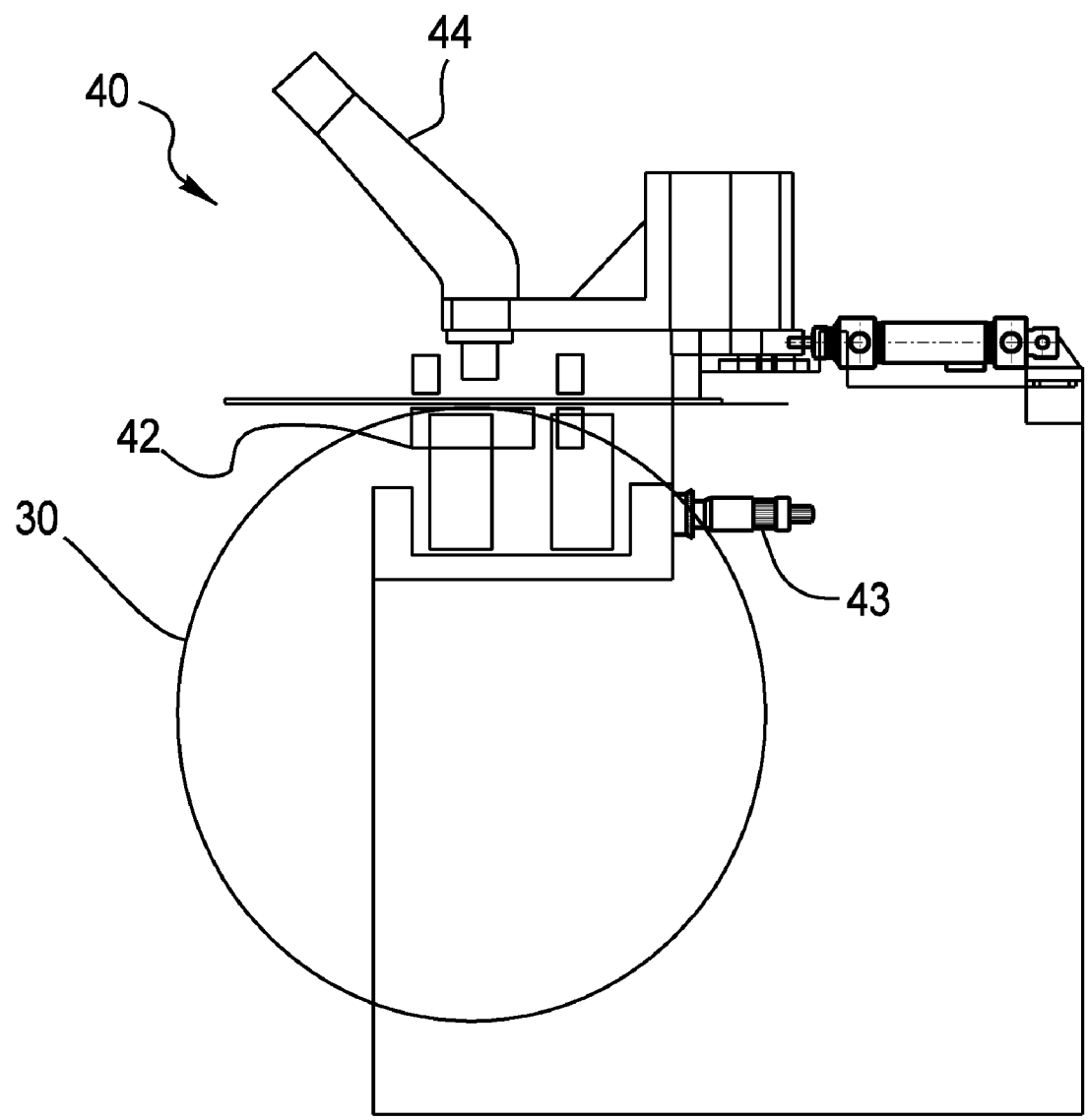
FIG. 5 is a side view of an exemplary clamping and alignment device that can be used with the method according to the present invention.

The printing plate 10 is secured to the remainder of the adhesive sheet 16. This now leaves a section of printing plate 26 which has not yet been attached to the adhesive sheet 16 because of the offset 24 in the initial attachment point. The dimension of region 24 and 26 are generally the same. The partially adhered printing plate 10 and adhesive sheet 16 are next rolled into a circular form 30, FIG. 3, (typically on a circular form or "mandrel" type of assembly and/or alignment device, as would be appreciated by those of skill in the art) and held in place using, for example, a sleeve assembly device 40, FIG. 5 using clamps 42 (or suction on the cylinder or some other means) and the like. The ends of the structure before final assembly are allowed to move towards each other in the direction indicated generally by arrows 15. The printing sleeve assembly device 40 will allow the alignment marks 12 to be viewed accurately (such as under one or more microscopes 44 or using a machine vision system utilizing cameras) and moved incrementally in any direction necessary to properly align the ends of the printing plate 10 before adhering the second end 26 of the plate 10 to the adhesive member 16 in the region 24.

Using either a manual or automatic alignment process using, for example, micrometers 43 and using equipment such as a microscope, camera, automated vision system or the like, the one or more registration marks 12 located on or near each end of the printing plate 10 are properly aligned and finally the second end region 26 of the printing plate is adhered to the first end region 24 of the adhesive member 16 after removing release sheet 19, thus forming a cylindrical "sleeve" 30 which can subsequently be mounted on a printing press drum.

In the preferred embodiment, the adhesive member 16 is provided in a circular or at least partially circular form. This is particularly necessary when the adhesive member 16 is a multilayered structure including two or more layers. In that case, the multilayered adhesive member 16 must be assembled in a generally circular form otherwise the multilayered structure 16 will be too resistant to bending and will not be able to be formed in a circular manner once the generally flat planar object is adhered to it as one or more of the assemblies will "buckle" and not properly form.

In this and other embodiments, it will be desirable to preform the adhesive member 16 into a generally circular form before adhering the generally flat, planar object 10 to its surface, although the alignment methodology described above will work equally as well with a circular adhesive member 16. As those of ordinary skill in the art will know, other adhering methodologies may also be used without departing from the scope of the present invention.

Using this system and method, each and every generally flat, planar object with alignment marks such as printing plates will be arranged in a circular format ready to be mounted on a printing press drum in perfect alignment thereby essentially eliminating misalignment and/or skew caused by improperly aligned printing plates.

It is important to note that the present invention is not intended to be limited to a system or method which must satisfy one or more of any stated objects or features of the invention. It is also important to note that the present invention is not limited to the preferred, exemplary, or primary embodiment(s) described herein. Modifications and substitutions by one of ordinary skill in the art are considered to be within the scope of the present invention, which is not to be limited except by any allowed claims and their legal equivalents.

What is claimed is:

1. A method for providing near perfect alignment of a generally flat, planar object placed onto a circular form, said method comprising the acts of:
   providing a first adhesive member having at least one surface with an adhesive layer thereon, the adhesive member having a first edge and a second edge and a length and a width;
   providing a first generally flat, planar object having approximately the same length and width as said adhesive member, said length defining a first edge and a second edge, said width defining a first side and a second side of said, the generally flat, planar object having four alignment marks, two of said four alignment marks located proximate the first and second side of said generally flat, planar object proximate said first edge and two of said four alignment marks located proximate the first and second side of said generally flat, planar object proximate said second edge of the generally flat, planar object;
   adhering the first edge of the generally flat, planar object to the at least one surface of the adhesive member having the adhesive layer beginning a predetermined distance from the first edge of the adhesive member and continuing to adhere the generally flat planar object to the at least one surface of the adhesive member having the adhesive layer such that the second edge of the generally flat planar object overhangs from the second edge of the adhesive member creating an area proximate said second edge of the generally flat planar object not adhered to the adhesive member, forming a generally flat planar object and adhesive member structure having a first edge and a second edge;
   partially forming said adhered generally flat planar object and adhesive structure into a generally circular shape, said partially formed generally circular shaped generally flat planar object and adhesive member structure including said area proximate said second edge of the generally flat planar object not adhered to the adhesive member;
   placing said adhered generally flat planar object and adhesive member structure partially formed into a generally circular shape onto an alignment device, said alignment device configured for holding said first and second edges of said generally flat planar object and adhesive member structure including the four alignment marks of said generally flat planar object in a movably fixed relationship to one another;
   aligning said four alignment marks of said generally flat planar object relative to one another, said aligning act defining a rectangle of predetermined size using said four alignment marks;
   once said four alignment marks of said generally flat planar object have been aligned relative to one another, adhering said previously non-adhered area proximate said second edge of said generally flat planar object to the adhesive layer proximate said first edge on said at least one surface of said adhesive member, for forming an aligned, cylinder shaped structure;
   providing at least a second adhesive member having the same features of the first adhesive member;
   providing at least a second generally flat, planar object having the same features as the first generally flat, planar object; and
   aligning and adhering said at least a second and subsequent adhesive member and generally flat, planar object according to the same acts as for said first adhesive member and generally flat, planar object, wherein any second and subsequent aligning act also defines said rectangle of the same predetermined size using said four alignment marks.

2. The method of claim 1, wherein said alignment device includes an alignment assistance device, configured for allowing simultaneous viewing of at least two of said four alignment marks, for facilitating alignment of said four alignment marks of said generally flat, planar object relative to one another.

3. The method of claim 2, wherein said alignment assistance device is selected from the group consisting of a microscope and a camera.

4. The method of claim 1, wherein said generally flat, planar object includes a printing plate having a top surface which includes indicia to be reproduced.

5. The method of claim 1, wherein each of said four alignment marks includes a two dimensional alignment mark proximate one edge of said generally flat, planar object.

6. The method of claim 5, wherein each said two dimensional alignment mark includes indicia for facilitating alignment of said generally flat planar object.

7. The method of claim 6, wherein said indicia is selected from the group consisting of a circular dot, an empty circle, a predetermined reference point on indicia disposed on said generally flat, planar object, and a crosshair mark.

8. The method of claim 1, wherein said generally flat planar object includes four corners, and wherein each of said four corners contains one of said four alignment marks.

9. The method of claim 8, wherein said four alignment marks include a two dimensional alignment mark.

10. The method of claim 1, wherein said four alignment marks each include a three-dimensional alignment mark 11. The method of claim 10, wherein said three dimensional alignment mark includes a top region having indicia for facilitating alignment of said generally flat planar object 12. The method of claim 1, wherein said adhesive member includes a generally flat planar adhesive member.

13. The method of claim 1, wherein said aligning act is performed by aligning two of said four alignment marks followed by aligning a remaining two of said four alignments marks, said aligning act defining said rectangle of predetermined size using said four alignment marks.

14. The method of claim 1, wherein said aligning act is performed by aligning a first one of said four alignment marks proximate said first side and first edge of said generally flat planar object with reference to a second one of said four alignment marks proximate said second side and first edge of said generally flat planar object, and aligning a third one of said four alignment marks proximate said first side and second edge of said generally flat planar object with reference to a fourth one of said four alignment marks proximate said second side and second edge of said generally flat planar object, said aligning act defining said rectangle of predetermined size using said four alignment mark.

15. A method for providing near perfect alignment of a printing plate onto an adhesive member for forming a printing equipment cylinder having a generally circular form, said method comprising the acts of:

providing a first generally flat, planar adhesive member having at least one surface with an adhesive layer thereon, the adhesive member having a first edge and a second edge and a length and a width;

providing a first printing plate having approximately the same length and width as said adhesive member, said length defining a first edge and a second edge, said width defining a first side and a second side of said generally flat, generally planar object, the printing plate including indicia to be reproduced using printing equipment and having four alignment marks, two of said four alignment marks located proximate the first and second side of said generally flat, planar object proximate said first edge and to of said four alignment marks located proximate the first and second side of said printing plate proximate said second edge of the printing plate;

adhering the first edge of the printing plate to the at least one surface of the adhesive member having the adhesive layer beginning a predetermined distance from the first edge of the adhesive member and continuing to adhere the printing plate to the adhesive member such that the second edge of the printing plate overhangs from the second edge of the adhesive member creating an area proximate said second edge of the printing plate not adhered to the adhesive member forming a printing plate and adhesive member structure;

at least partially forming said printing plate and adhesive member structure into a generally circular shape, said partially formed generally circular shaped printing plate and adhesive member structure including said area proximate said second edge of said printing plate not adhered to the adhesive member;

placing said printing plate and adhesive member structure onto an alignment device, said alignment device including a mechanism for allowing alignment the four alignment marks of said printing plate in relationship to one another while in said generally circular shape, and for allowing said four alignment marks of said printing plate to be aligned relative to one another;

aligning said four alignment marks of said printing plate relative to one another, said aligning act defining a rectangle of predetermined size using said tour alignment marks;

once said four alignment marks of said printing plate have been aligned relative to one another, adhering said previously non-adhered area proximate said second edge of said printing plate to the adhesive layer proximate said first edge on said top surface of said adhesive member, for forming an aligned, cylinder shaped structure containing said printing plate;

providing at least a second adhesive member having the same features of the first adhesive member;

providing at least a second printing plate having the same features as the first printing plate; and aligning and adhering said at least a second and subsequent adhesive members and printing plates according to the same acts as for said first adhesive member and printing plate, wherein any second and subsequent aligning act also defines said rectangle of the same predetermined size using said four alignment marks.

16. The method of claim 15, wherein said four alignment marks includes two, two dimensional alignment marks proximate each of said first and second edges of said printing plate.

17. The method of claim 15, wherein said printing plate includes four corners, and wherein one alignment mark of said four alignment marks is located proximate each of said four corners of said printing plate.

18. The method of claim 17, wherein each of said four alignment marks includes a two dimensional alignment mark.

19. The method of claim 18, wherein each said two dimensional alignment mark includes indicia for facilitating alignment of said printing plate.

20. The method of claim 19, wherein said indicia is selected from the group consisting of a circular dot, an empty circle, a predetermined reference point in an image located on said printing plate and a crosshair mark.

21. The method of claim 15, wherein said four alignment marks each include a three-dimensional alignment mark.

22. The method of claim 21, wherein said at least one three dimensional alignment mark includes a top region having indicia for facilitating alignment of said printing plate.

23. The method of claim 15, wherein said alignment device includes an alignment assistance device, configured for allowing simultaneous viewing of at least two of said four alignment marks, for facilitating alignment of said first and second edges of said printing plate relative to one another.

24. The method of claim 23, wherein said alignment assistance device is selected from the group consisting of a microscope and a camera.

25. The method of claim 15, wherein said aligning act is performed by aligning two of said four alignment marks followed by aligning a remaining two of said four alignments marks, said aligning act defining said rectangle of predetermined size using said four alignment marks.

26. The method of claim 15, wherein said aligning act is performed by aligning a first one of said four alignment marks proximate said first side and first edge of said printing plate with reference to a second one of said four alignment marks proximate said second side and first edge of said printing plate, and aligning a third one of said four alignment marks proximate said first side and second edge of said printing plate with reference to a fourth one of said four alignment marks proximate said second side and second edge of said printing plate.

27. A system for providing near perfect alignment of a printing plate onto an adhesive member, the resultant structure configured for being rolled into a circular form, said system comprising:

an adhesive member having at least one surface with an adhesive layer thereon, the adhesive member having a first edge and a second edge and a length and a width;

a printing plate having approximately the same length and width as said adhesive member, said length defining a first edge and a second edge, said width defining a first side and a second side of said printing plate the printing plate having four alignment marks, two of said four alignment marks located proximate the first and second sides of said printing plate proximate said first edge, and two of said four alignment marks located proximate the first and second side of said printing plate proximate said second edge of the printing plate, said adhesive member and said printing plate configured for allowing adhering the first edge of the printing plate to the at least one surface of the adhesive member having the adhesive layer, beginning a predetermined distance from the first edge of the adhesive member and continuing to adhere the printing plate to the adhesive member such that the second edge of the printing plate overhangs from the second edge of the adhesive member creating an area proximate said second edge of the printing plate not adhered to the adhesive member forming a printing plate and adhesive member structure, and further configured for allowing said printing plate and adhesive member structure to be rolled into a cylindrical form, and once rolled into a cylindrical form, the four alignment marks aligned relative to one another, said aligning defining a rectangle of predetermined size using said four alignment marks, and once said four alignment marks of said printing plate have been aligned relative to one another, allowing said previously non-adhered area proximate said second edge of said printing plate to be adhered to the adhesive layer proximate said first edge on said top surface of said adhesive member;

at least a second adhesive member and at least a second printing plate, said at least a second adhesive member and at least a second printing plate having the same features and characteristics as a first adhesive member and printing plate, and wherein the at least a second adhesive member and printing plate are aligned according to the same acts as for said first adhesive member and printing plate, wherein any second and subsequent aligning act also defines said rectangle of the same predetermined size using said four alignment marks; and an alignment device, said alignment device including a mechanism for holding the first and second edges of said printing plate in adjustable relationship to one another and for allowing said four alignment marks of said printing plate to be aligned relative to one another, said alignment device including an alignment assistance device, configured for allowing viewing of at least two of said four alignment marks, for facilitating alignment of four alignment marks of said printing plate relative to one another.

28. The method of claim 27, wherein said aligning act is performed by aligning two of said four alignment marks followed by aligning a remaining two of said four alignments marks, said aligning act defining said rectangle of predetermined size using said four alignment marks.

29. The system of claim 27, wherein said adhesive member is provided as a generally flat, planar member.

30. The system of claim 27, wherein said adhesive member is provided as a generally circular member.

31. The system of claim 30, wherein said generally circular adhesive member is a single layer structure.

32. The system of claim 30, wherein said generally circular adhesive member is a multi-layered structure.

33. The method of claim 27, wherein said aligning act is performed by aligning a first one of said four alignment marks proximate said first side and first edge of said printing plate with reference to a second one of said four alignment marks proximate said second side and first edge of said printing plate, and aligning a third one of said four alignment marks proximate said first side and second edge of said printing plate with reference to a fourth one of said four alignment marks proximate said second side and second edge of said printing plate.

* * * * *